(12) United States Patent
Kim et al.

(10) Patent No.: US 11,563,372 B2
(45) Date of Patent: Jan. 24, 2023

(54) ELECTRONIC APPARATUS INCLUDING OPERATOR AND POWER CIRCUIT CONFIGURED TO SUPPLY POWER TO THE OPERATOR

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Shinwook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/973,334

(22) PCT Filed: Jul. 11, 2019

(86) PCT No.: PCT/KR2019/008577
§ 371 (c)(1),
(2) Date: Dec. 8, 2020

(87) PCT Pub. No.: WO2020/013635
PCT Pub. Date: Jan. 16, 2020

(65) Prior Publication Data
US 2021/0249950 A1     Aug. 12, 2021

(30) Foreign Application Priority Data

Jul. 13, 2018    (KR) ........................ 10-2018-0081878

(51) Int. Cl.
*H02M 1/42*     (2007.01)
*H02M 3/335*    (2006.01)
*H02M 1/00*     (2006.01)

(52) U.S. Cl.
CPC ......... *H02M 1/4208* (2013.01); *H02M 1/007* (2021.05); *H02M 1/42* (2013.01); *H02M 3/33573* (2021.05); *H02M 1/0032* (2021.05)

(58) Field of Classification Search
CPC .............. H02M 1/4208; H02M 1/007; H02M 3/33573; H02M 1/0032; H02M 1/4225;
(Continued)

(56) References Cited

U.S. PATENT DOCUMENTS 3,869,658 A * 3/1975 Hanke ................... H02M 3/285
363/25
5,825,164 A * 10/1998 Williams ................ H02P 13/06
323/239
(Continued)

FOREIGN PATENT DOCUMENTS

EP       2866341 A1   4/2015
JP     2009-004156 A   1/2009
(Continued)

OTHER PUBLICATIONS

Communication dated Jul. 14, 2021 issued by the European Patent Office in European Application No. 19834910.2.
(Continued)

*Primary Examiner* — Yusef A Ahmed
(74) *Attorney, Agent, or Firm* — Sughrue Mion, PLLC

(57) ABSTRACT

An electronic apparatus includes: an operator; and a power circuit configured to supply power to the operator, wherein the power circuit includes a first voltage converter configured to output a first voltage based on input power, and a power factor corrector (PFC) configured to output a second voltage by performing power factor correction for the first voltage, and supplies power based on the first voltage or the second voltage to the operator, wherein the power circuit stops an operation of the PFC, lowers the first voltage to
(Continued)

have a level corresponding to the second voltage, and supplies power based on the lowered first voltage to the operator, based on power consumption of the operator lower than or equal to a predetermined value.

10 Claims, 17 Drawing Sheets

(58) Field of Classification Search
CPC ......... Y02D 10/00; G06F 1/28; G06F 1/3296; G06F 1/26; Y02B 70/10; H02P 13/06
See application file for complete search history.

(56) References Cited

U.S. PATENT DOCUMENTS

| | | | | |
|---|---|---|---|---|
| 6,055,167 | A * | 4/2000 | Shamkovich | H02M 7/1623 363/54 |
| 8,587,221 | B2 * | 11/2013 | Liu | H05B 45/3725 315/307 |
| 8,885,367 | B2 * | 11/2014 | Busch | H02M 1/126 363/39 |
| 9,087,656 | B1 * | 7/2015 | Vinciarelli | H02M 1/4258 |
| 10,886,856 | B2 * | 1/2021 | Yang | H02M 1/08 |
| 2002/0118553 | A1 * | 8/2002 | Morita | H02M 1/4208 363/25 |
| 2003/0052653 | A1 * | 3/2003 | Mendenhall | H02M 1/4225 323/210 |
| 2005/0018458 | A1 * | 1/2005 | Shimada | H02M 1/4225 363/125 |
| 2005/0030772 | A1 * | 2/2005 | Phadke | H02M 3/28 363/71 |
| 2006/0214513 | A1 * | 9/2006 | Tan | H02J 9/062 307/64 |
| 2008/0025148 | A1 * | 1/2008 | Camwell | E21B 47/16 367/162 |
| 2008/0061753 | A1 | 3/2008 | Koegel et al. | |
| 2008/0315783 | A1 * | 12/2008 | Inaba | H05B 45/12 315/247 |
| 2008/0316779 | A1 * | 12/2008 | Jayaraman | H02M 3/156 363/89 |
| 2009/0290384 | A1 * | 11/2009 | Jungreis | H02M 1/4241 363/17 |
| 2010/0080026 | A1 | 4/2010 | Zhang | |
| 2010/0141037 | A1 * | 6/2010 | Joo | H02M 1/36 307/64 |
| 2010/0332063 | A1 * | 12/2010 | Saeki | B60L 58/30 701/22 |
| 2011/0122662 | A1 * | 5/2011 | Li | H02M 1/32 363/49 |
| 2012/0001599 | A1 * | 1/2012 | Tanaka | H02M 1/4208 323/205 |
| 2012/0106218 | A1 * | 5/2012 | Awane | H02M 3/335 363/127 |
| 2012/0212144 | A1 * | 8/2012 | Hayashi | H05B 45/54 315/193 |
| 2012/0236612 | A1 * | 9/2012 | Uno | H02M 3/157 363/126 |
| 2013/0099788 | A1 * | 4/2013 | Xu | H02M 3/3376 324/322 |
| 2013/0329469 | A1 * | 12/2013 | Kubota | H02M 3/33507 363/21.16 |
| 2014/0160820 | A1 * | 6/2014 | McKinley | H01F 38/32 363/126 |
| 2014/0177301 | A1 * | 6/2014 | Kim | H02M 7/23 363/84 |
| 2016/0141964 | A1 * | 5/2016 | Yu | H02M 3/33507 363/21.02 |
| 2017/0170734 | A1 * | 6/2017 | Sheng | H02M 3/33576 |
| 2017/0302159 | A1 * | 10/2017 | Green | H02M 1/14 |
| 2017/0353121 | A1 * | 12/2017 | Liu | H02M 1/42 |
| 2018/0222333 | A1 * | 8/2018 | Khaligh | H02M 3/33584 |
| 2018/0287466 | A1 * | 10/2018 | Kim | H02P 27/06 |
| 2019/0075630 | A1 * | 3/2019 | Lee | H05B 47/10 |
| 2019/0245432 | A1 * | 8/2019 | Yan | H02M 1/08 |
| 2019/0280346 | A1 * | 9/2019 | Liao | H02J 9/062 |
| 2020/0083816 | A1 * | 3/2020 | Kim | G09G 3/00 |
| 2020/0099300 | A1 * | 3/2020 | Ishikawa | H02M 3/1582 |
| 2020/0306890 | A1 * | 10/2020 | Gharib | B23K 28/02 |
| 2020/0403517 | A1 * | 12/2020 | Huang | H02M 3/33584 |
| 2020/0413513 | A1 * | 12/2020 | Mohan | H03F 3/2171 |
| 2021/0021207 | A1 * | 1/2021 | Choi | H02M 1/4208 |
| 2021/0043126 | A1 * | 2/2021 | Kim | H02J 4/00 |
| 2021/0057989 | A1 * | 2/2021 | Jang | H04N 5/63 |
| 2021/0211056 | A1 * | 7/2021 | Moriyama | H02M 1/0006 |

FOREIGN PATENT DOCUMENTS

| | | |
|---|---|---|
| JP | 2013-102689 A | 5/2013 |
| JP | 2014-3857 A | 1/2014 |
| JP | 2014-135846 A | 7/2014 |
| JP | 2015-35937 A | 2/2015 |
| JP | 2015-173524 A | 10/2015 |
| JP | 2016-046966 A | 4/2016 |
| JP | 6272691 B2 | 1/2018 |
| WO | 2014158162 A1 | 10/2014 |

OTHER PUBLICATIONS

International Search Report dated Nov. 14, 2019 issued by the International Searching Authority in International Application No. PCT/KR2019/008577 (PCT/ISA/210).
Communication dated Aug. 29, 2022 issued by the European Patent Office in European Patent Application No. 19834910.2.
Communication dated Sep. 7, 2022 issued by the Korean Patent Office in Korean Patent Application No. 10-2018-0081878.

* cited by examiner

ELECTRONIC APPARATUS INCLUDING OPERATOR AND POWER CIRCUIT CONFIGURED TO SUPPLY POWER TO THE OPERATOR

TECHNICAL FIELD

The disclosure relates to an electronic apparatus, and more particularly to an electronic apparatus including a power circuit with a power factor corrector.

BACKGROUND ART

In alternating current (AC) circuits, voltage and current are varied in a sinusoidal waveform, but there may be cases where the sinusoidal waveforms of them are out of phase with each other, or the current has not the sinusoidal waveform but a pulse waveform. These cases cause a ratio of really used active power to the apparent power, in other words, the power factor (PF) to decrease, thereby increasing energy loss.

Therefore, a power circuit of a television (TV) or the like electronic apparatus that receives AC power includes a power factor corrector (PFC) to correct the power factor as far as possible.

With recent trends of the electronic apparatus having various additional functions, the TV or the like electronic apparatus may perform only an operation of a light load, i.e. low power consumption mode, such as a gallery mode, a picture-frame mode, a clock mode, an Internet-of-things (IoT) mode, etc. without performing a general TV operation of processing and displaying an image signal containing a broadcast in a partial section.

In such a light-load section of the low power consumption, there are no needs of satisfying power factor restraints, and therefore it is possible to reduce one stage in power conversion of the power circuit by turning off the PFC and thus making voltage to bypass the turned-off PFC, thereby improving the whole system efficiency.

The PFC is designed as a step-up PFC circuit or a step-down PFC circuit according to environments and the like conditions. The step-up PFC circuit is designed to have an output to which devices having a voltage rating higher than a PFC input voltage are connected, so that the voltage can bypass the PFC without difficulty.

The step-down PFC circuit is designed to have an output to which devices having a lower voltage rating than that of the step-up PFC circuit, and thus the step-down PFC circuit may be used as the PFC under a specific condition.

However, when the PFC is given as the step-down PFC circuit, the PFC works for only a voltage drop even in the light load section where the power factor correction is not required, and therefore a problem of lowering the whole system efficiency arises in the light load section.

DISCLOSURE

Technical Problem

Accordingly, an aspect of the disclosure is to solve the foregoing problems and provide an electronic apparatus in which a power factor corrector (PFC) does not work in a light load section of low power consumption and operations are stable even under a voltage bypass even though the electronic apparatus includes a power circuit employs a step-down PFC.

Further, an aspect of the disclosure is to provide an electronic apparatus which controls not only an operating frequency or duty but also a voltage gain of an alternating current (AC)-AC transformer to prevent a circuit's own efficiency from being lowered even though an output voltage of the AC-AC transformer has a very large variable range.

Technical Solution

According to an embodiment of the disclosure, an electronic apparatus includes: an operator; and a power circuit configured to supply power to the operator, wherein the power circuit includes a first voltage converter configured to output a first voltage based on input power, and a power factor corrector (PFC) configured to output a second voltage by performing power factor correction for the first voltage, and supplies power based on the first voltage or the second voltage to the operator, wherein the power circuit stops an operation of the PFC, lowers the first voltage to have a level corresponding to the second voltage, and supplies power based on the lowered first voltage to the operator, based on power consumption of the operator lower than or equal to a predetermined value.

The power circuit may further include a second voltage converter configured to output a third voltage, which is obtained by adjusting the level of the first voltage or second voltage, to the operator.

The PFC may include a bypasser configured to selectively connect the first voltage converter and the second voltage converter by bypassing the PFC.

The electronic apparatus may further include a controller configured to control the first voltage converter to lower the first voltage to have the level corresponding to the second voltage, and output a signal for connecting the bypass to transmit the first voltage to the second voltage converter, based on the power consumption of the operator lower than or equal to a predetermined value.

The first voltage converter may include an alternating current (AC)-AC transformer configured to output the first voltage; and a transformer controller configured to control an operation of the AC-AC transformer by feeding back an output voltage of the AC-AC transformer, and the controller may include a detector configured to output a first signal based on the power consumption of the operator lower than or equal to a predetermined value; and a voltage regulator configured to regulate a voltage fed back to the transformer controller based on the first signal received from the detector.

The voltage regulator may include a switch configured to operate based on a first signal received from the detector, and an impedance converter including a plurality of resisters, and the impedance converter may be changed in impedance based on the operation of the switch to regulate the voltage fed back to the transformer controller.

The transformer controller may control the AC-AC transformer to lower the first voltage to have the level corresponding to the second voltage, by controlling an operating frequency or a duty ratio of the AC-AC transformer based on the regulation of the voltage to be fed back.

The AC-AC transformer may include a tap at a primary side or a secondary side, and a switch connected to the tap and configured to operate based on the first signal received from the detector, and the AC-AC transformer may be controlled with regard to a voltage gain based on the operation of the switch, and lower the first voltage to have the level corresponding to the second voltage.

The detector may be configured to output the first signal, and further output a second signal to the PFC based on a lapse of a preset time.

The detector may monitor the output voltage of the AC-AC transformer and output the second signal based on the voltage output from the AC-AC transformer to the power factor controller lower than or equal to a predetermined value.

The bypasser may include a bypass switch configured to form a bypassing path as turned on or off based on reception of the second signal.

The detector may be configured to receive a mode signal corresponding to a light load, and detect the power consumption of the operator lower than or equal to a predetermined value.

The AC-AC transformer and the voltage regulator may be provided in an adapter configured to receive the input power, and the PFC may be provided in a main body of the electronic apparatus.

The PFC may include a step-down power factor correction circuit.

Advantageous Effects

In the foregoing electronic apparatus according to the disclosure, a power factor corrector (PFC) does not work in a light load section of low power consumption and operations are stable even under a voltage bypass even though the electronic apparatus includes a power circuit employs a step-down PFC.

Further, according to the disclosure, not only an operating frequency or duty but also a voltage gain of an alternating current (AC)-AC transformer is controlled to prevent a circuit's own efficiency from being lowered even though an output voltage of the AC-AC transformer has a very large variable range.

BEST MODE

Figure 1:
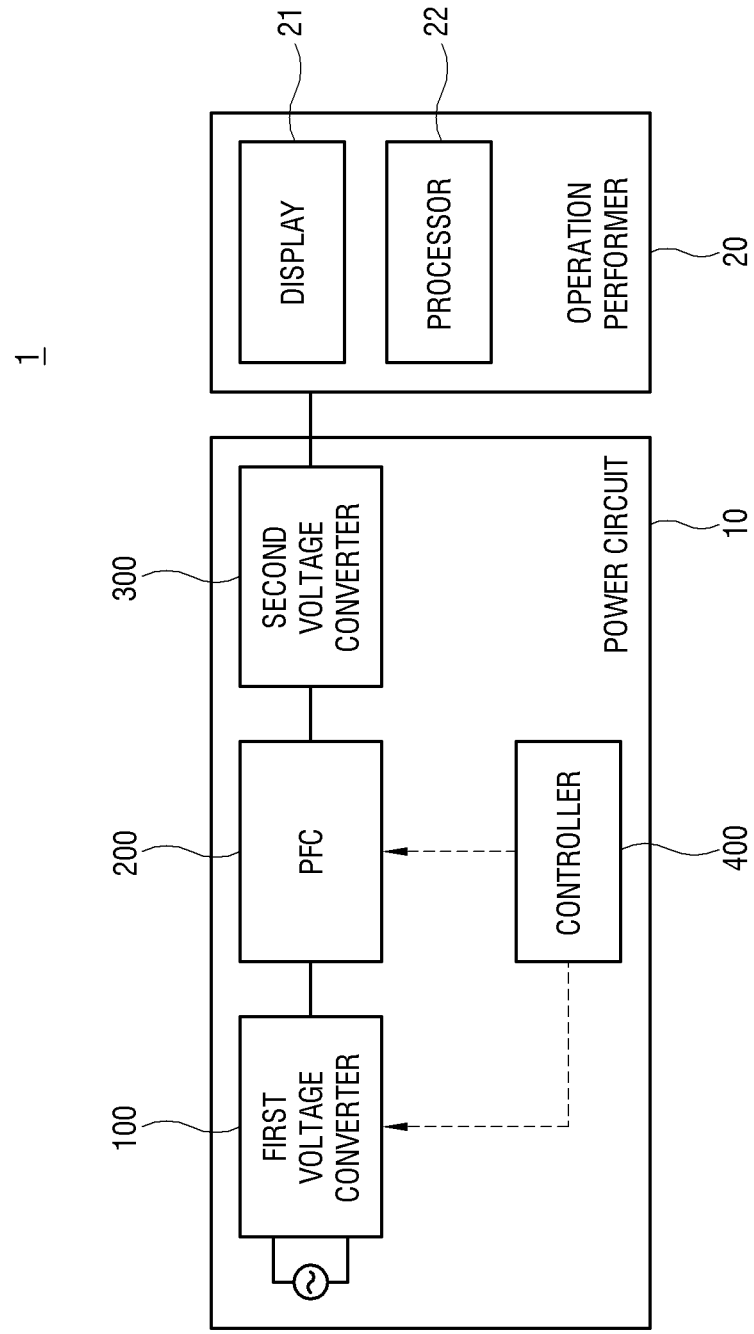
FIG. 1 is a block diagram of an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 is a block diagram of an electronic apparatus according to an embodiment of the disclosure.

An electronic apparatus 1 according to an embodiment of the disclosure, as shown in FIG. 1, includes a power circuit 10 supplying power, and an operation performer 20 (hereinafter, referred to as an operator) receiving power from the power circuit 10 and performing operations.

The operation performer 20 consumes power to perform a predetermined function, and includes a display 21, a processor 22 and the like electronic devices provided for performing the operations of the electronic apparatus 1. FIG. 1 illustrates the display 21 and the processor 22 as an example of the electronic devices of the operation performer 20, but there are no limits to the kinds of electronic devices according to the disclosure. In other words, the electronic devices may include various elements provided as loads that consume power in the electronic apparatus 1.

The power circuit 10 receives input power (i.e. alternating current (AC) power) from a wall of a home, an office, etc.

According to an embodiment, the electronic apparatus 1 may, as shown in FIG. 1, include a display apparatus such as a television (TV) that processes a broadcast image based on at least one of a broadcast signal, broadcast information or broadcast data received from a transmitter of a broadcasting station.

The display apparatus may, for example, wirelessly receive a radio frequency (RF) signal, i.e. a broadcast signal from the broadcasting station. To this end, the display apparatus may include an antenna configured to receive a broadcast signal, and a tuner configured to be tuned to a channel corresponding to a broadcast signal. The broadcast signal to be received in the display apparatus may be received through a terrestrial wave, a cable, a satellite, etc., and a signal source according to the disclosure is not limited to the broadcasting station. In other words, the signal source according to the disclosure may include any apparatus or station as long as it can transmit/receive or relay data like a set-top box, a player for an optical disc such as a Blu-ray disc (BD), a digital versatile disc (DVD), etc.

The standards of the signal received in the electronic apparatus 1 may be varied depending on the types of the electronic apparatus 1. For example, the electronic apparatus 1 may receive an image signal based on high definition multimedia interface (HDMI), composite video, component video, super video, syndicat des constructeurs des appareils radiorécepteurs et téléviseurs (SCART), or the like standards. Further, the electronic apparatus 1 may wirelessly receive an image signal based on Wi-Fi, Wi-Fi direct, Bluetooth or the like wireless communication.

According to an embodiment, the electronic apparatus 1 embodied by the display apparatus may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

However, the electronic apparatus 1 according to the disclosure is not limited to the display apparatus such as the TV, but may include any apparatus as long as it can receive AC power and perform operations. In other words, the electronic apparatus 1 may for example include a personal computer (PD) apparatus (or a monitor connected to a computer main body) such as a laptop or desktop computer, or various home appliances, etc.

In the electronic apparatus 1 according to an embodiment of the disclosure, the power circuit 10, as shown in FIG. 1, includes a first voltage converter 100, a power factor corrector (PFC) 200, a second voltage converter 300, and a controller 400.

Figure 2:
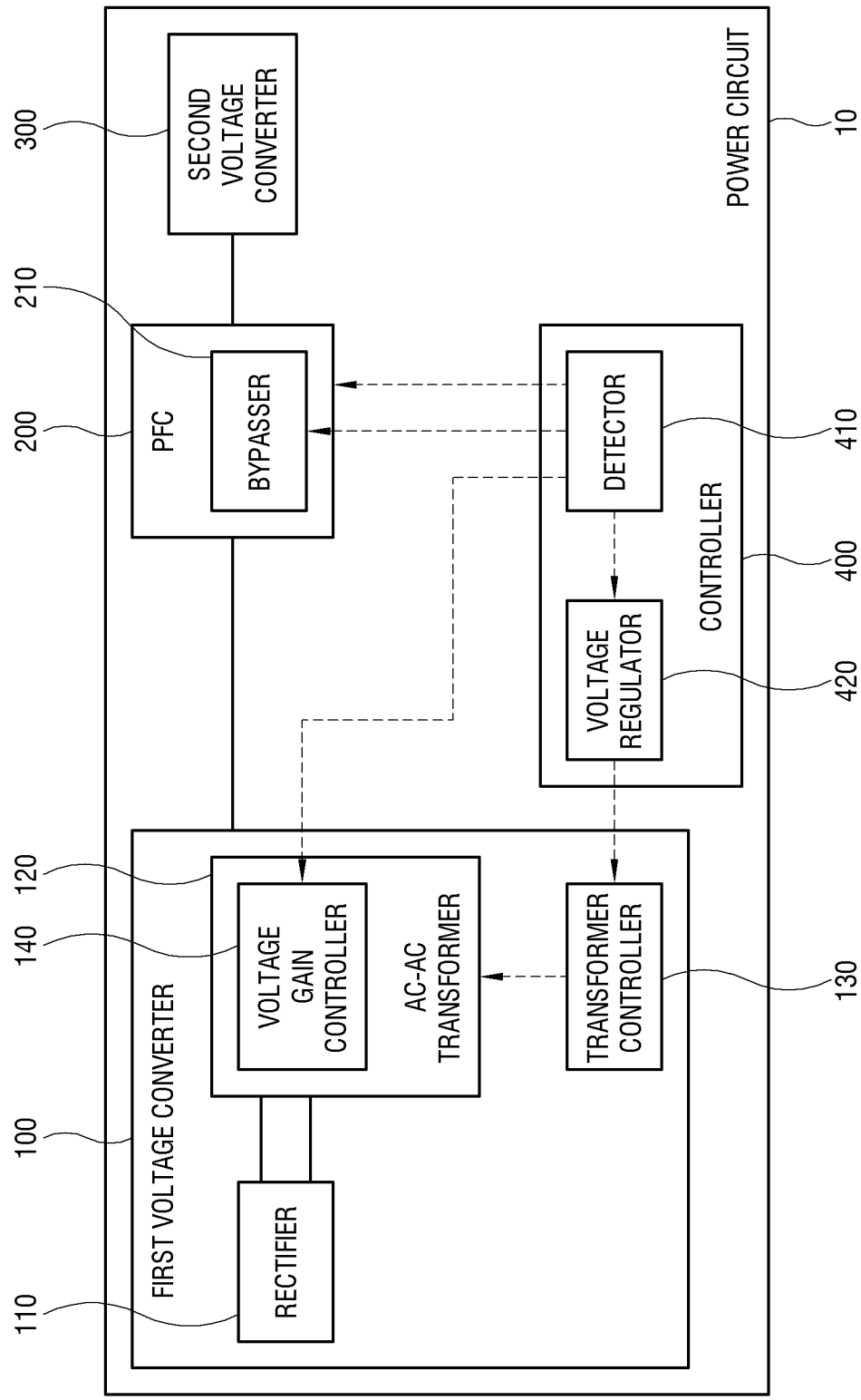
FIG. 2 is a block diagram of a power circuit in an electronic apparatus according to an embodiment of the disclosure.

FIG. 2 is a block diagram of a power circuit in an electronic apparatus according to an embodiment of the disclosure.

The first voltage converter 100 outputs a first voltage based on input power (AC power).

The first voltage converter 100, as shown in FIG. 2, includes a rectifier 110, an AC-AC transformer 120, and a transformer controller 130.

The rectifier 110 rectifies the input power, in other words, AC power and outputs the rectified power to the AC-AC transformer 120. According to an embodiment, the rectifier 110 may include a plurality of diodes, and is thus embodied as a bridge diode circuit for applying full-wave rectification to the input power.

The AC-AC transformer 120 receives power subjected to the full-wave rectification from the rectifier 110, and is embodied as a transformer that transfers power from a primary side to a secondary side. The AC power subjected to the full-wave rectification in the rectifier 110 is generated as a full-wave rectified voltage insulated through the AC-AC transformer 120.

As described above, the voltage generated through the rectifier 110 and the AC-AC transformer 120 and output to the PFC 200 is a first voltage output from the first voltage converter 100.

According to an embodiment, the AC-AC transformer 120 is embodied as a high-frequency transformer.

According to an embodiment, the AC-AC transformer 120 may be embodied as a full-bridge converter including a plurality of field effect transistors (FET). However, the embodiment is not limited to the full-bridge form, and any converter using the transformer may be applied to the AC-AC transformer 120 according to the disclosure.

According to an embodiment, the AC-AC transformer 120 includes taps at a primary side or a secondary side, and a transformer turn ratio is changeable by an operation of the switch (e.g. '141' in FIG. 7) connected to the tap. The switch 141 is an example of the voltage gain controller 140 shown in FIG. 2. The embodiment in which the transformer turn ratio is changed by the voltage gain controller 140 will be described in detail in connection with the operations of the voltage gain controller 140 to be described later.

The transformer controller 130 controls operations of the AC-AC transformer 120. Specifically, the transformer controller 130 receives voltage as feedback from the PFC 200, and changes at least one of duty or an operating frequency applied to the FET of the AC-AC transformer 120, thereby controlling the output voltage of the AC-AC transformer 120 to be varied, i.e. lowered.

The transformer controller 130 according to an embodiment of the disclosure receives the voltage changed in level by the controller 400 as the feedback when the power consumption of the operator 20 including the electronic devices 21 and 22 is lower than or equal to a preset value, and controls the operations of the AC-AC transformer 120 based on the changed feedback voltage. Specifically, the transformer controller 130 controls the first voltage output from the AC-AC transformer 120 to be lowered into a level corresponding to a second voltage based on the changed feedback voltage. Here, the level corresponding to the second voltage is the level of the voltage output from the PFC 200 that performs power factor correction.

According to the disclosure, a case where the power consumption is lower than or equal to a predetermined value will be called a light load, and on the contrary a case where the TV or the like electronic apparatus 1 performs a general operation of processing and displaying a broadcast or the like image signal will be called a normal load or heavy load. As an example of the light load, there is an ambient mode in which the TV provides weather, time, news and the like living information in real time, reproduces pictures, photographs and the like content together with background music (e.g. a gallery mode, a picture frame mode, or a magic screen), or operates an IoT apparatus.

The PFC 200 outputs the second voltage by applying the power factor correction to the first voltage received from the first voltage converter 100.

According to an embodiment, the PFC 200 may be designed as a step-down PFC circuit, for example, a single-ended primary-inductor converter (SEPIC) PFC converter or a buck PFC converter including an FET turned on or off based on a pulse width modulation (PWM) control signal.

The PFC 200 according to an embodiment of the disclosure, as shown in FIG. 2, includes a bypasser 210 allowing the input first voltage to bypass the PFC 200.

The bypasser 210 includes a switch for selective connection between the first voltage converter 100 and the second voltage converter. A concrete embodiment of the bypasser 210 will be described in more detail with reference to FIGS. 10 and 11.

According to an embodiment of the disclosure, when the bypasser 210 turns off the PFC 200, in other words, sets a bypass mode, the first voltage output from the first voltage converter 100 (i.e. the first voltage dropped into the level corresponding to the second voltage) is output to the second voltage converter 300 by bypassing the PFC 200.

When the PFC 200 bypasses the voltage, the voltage conversion of the power circuit 10 is decreased by one step, thereby improving the whole system efficiency. According to an embodiment of the disclosure, the PFC 200 is set to enter the bypass mode when the electronic apparatus 1 operates in the light load without being restricted by power factor restraints.

The second voltage converter 300 outputs a third voltage obtained by adjusting the level of the second voltage or the first voltage received from the PFC 200 to the operator 20.

According to an embodiment, the second voltage converter 300 may be embodied as a circuit including a switched mode power supply (SMPS) or a direct current (DC)-DC converter that converts second power into third power and stably supplies the third power to the load, i.e. the operator 20 including the electronic devices 21 and 22.

The controller 400 outputs a control signal to the first voltage converter 100 and the PFC 200 while the electronic apparatus 1 operates in the light load in which the power consumption of the operator 20 including the electronic devices 21 and 22 is lower than or equal to a predetermined value. Below, at the operation with the light load, the control signal output from the controller 400 to the first voltage converter 100 or the PFC 200 will be called a light load signal.

The controller 400, as shown in FIG. 2, includes a detector 410 and a voltage regulator 420.

The detector 410 detects that the electronic apparatus 1 operates with the light load.

According to an embodiment, the detector 410 is embodied as a load detecting circuit that detects whether the power consumption of the load, i.e. the operator 20 including the electronic devices 21 and 22 is lower than or equal to a predetermined value.

According to an alternative embodiment, the detector 410 may receive a mode signal corresponding to the light load operation from, for example, the processor 22 or the like. In this case, the light load operation is easily identified without detecting the power level of the operator 20 including the display 21 and the like electronic devices.

The voltage regulator 420 provides the feedback voltage, the level of which is regulated, to the transformer controller 130 based on the light load signal, thereby allowing the transformer controller 130 to change the output voltage of the AC-AC transformer 120.

Figure 3:
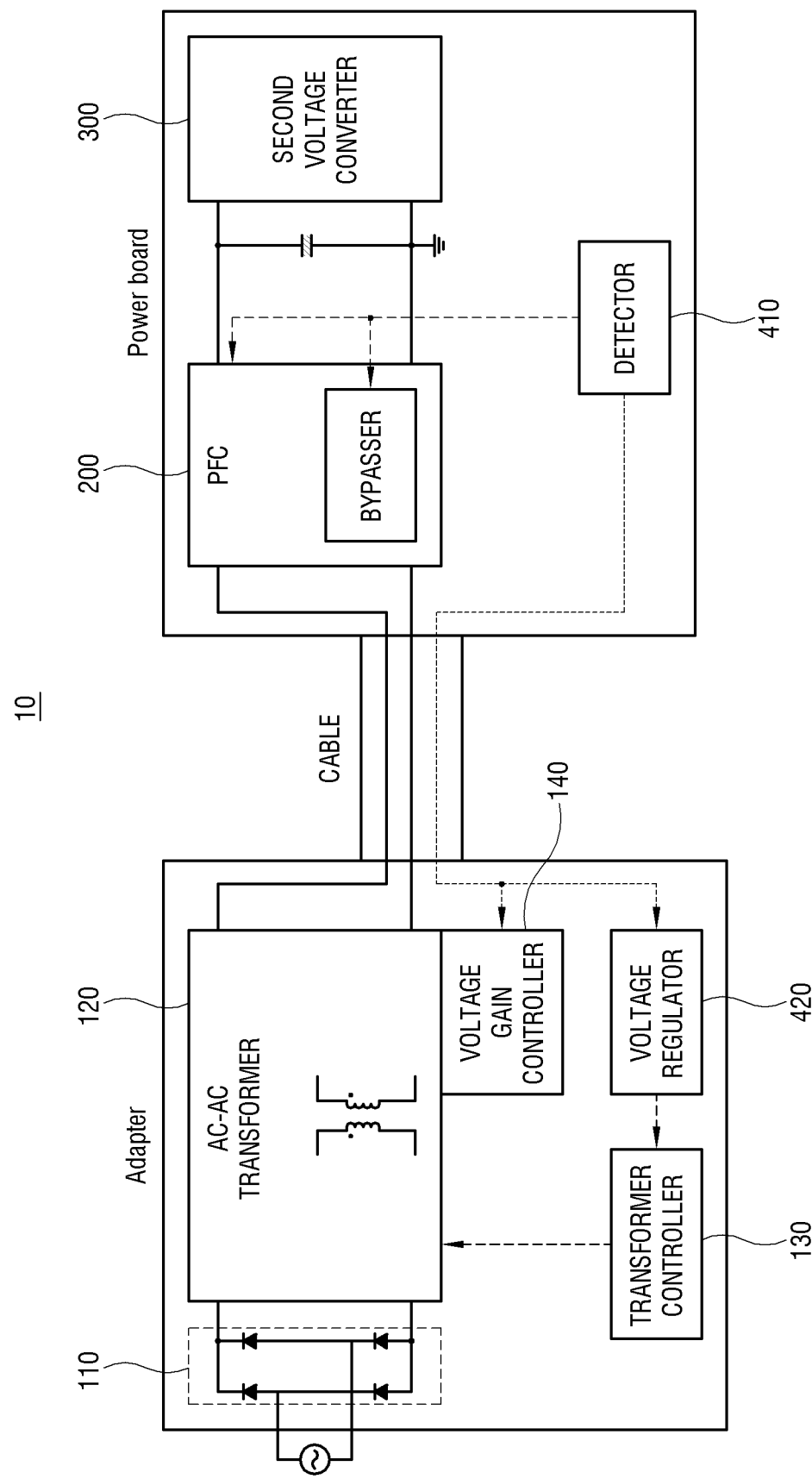
FIG. 3 illustrates an example in which a power circuit of an electronic apparatus according to an embodiment of the disclosure is embodied.

FIG. 3 illustrates an example in which a power circuit of an electronic apparatus according to an embodiment of the disclosure is embodied.

The power circuit 10 according to an embodiment of the disclosure, as shown in FIG. 3, includes elements distributively provided in an adaptor for receiving AC power and a power board of a main body of the electronic apparatus 1, in which the adapter and the power board are connected by a cable. According to an embodiment of the disclosure, there are no limits to the kinds of cables, and the cable may include an electric wire, an optical cable, or the like capable of transmitting power and a control signal.

In the power circuit 10 according to the embodiment shown in FIG. 3, the rectifier 110, the AC-AC transformer 120, the transformer controller 130, the voltage gain controller 140 and the voltage regulator 420 are provided in the adapter, and the PFC 200, the second voltage converter 300 and the detector 410 are provided in the power board.

In other words, the power circuit 10 of FIG. 3 has advantages that the PFC 200 of generating a lot of heat and being relatively bulky is placeable in not the adaptor of which design is restricted by size, temperature, etc. but the power board.

According to an embodiment, the detector 410 outputs a control signal to the voltage regulator 420 and a voltage gain controller 430 through the cable. However, the means for transmitting a signal between the adapter and the power board is not limited to the cable. For example, the signal may be transmitted and received by wireless communication, for example, Wi-Fi, Bluetooth, etc.

Figure 4:
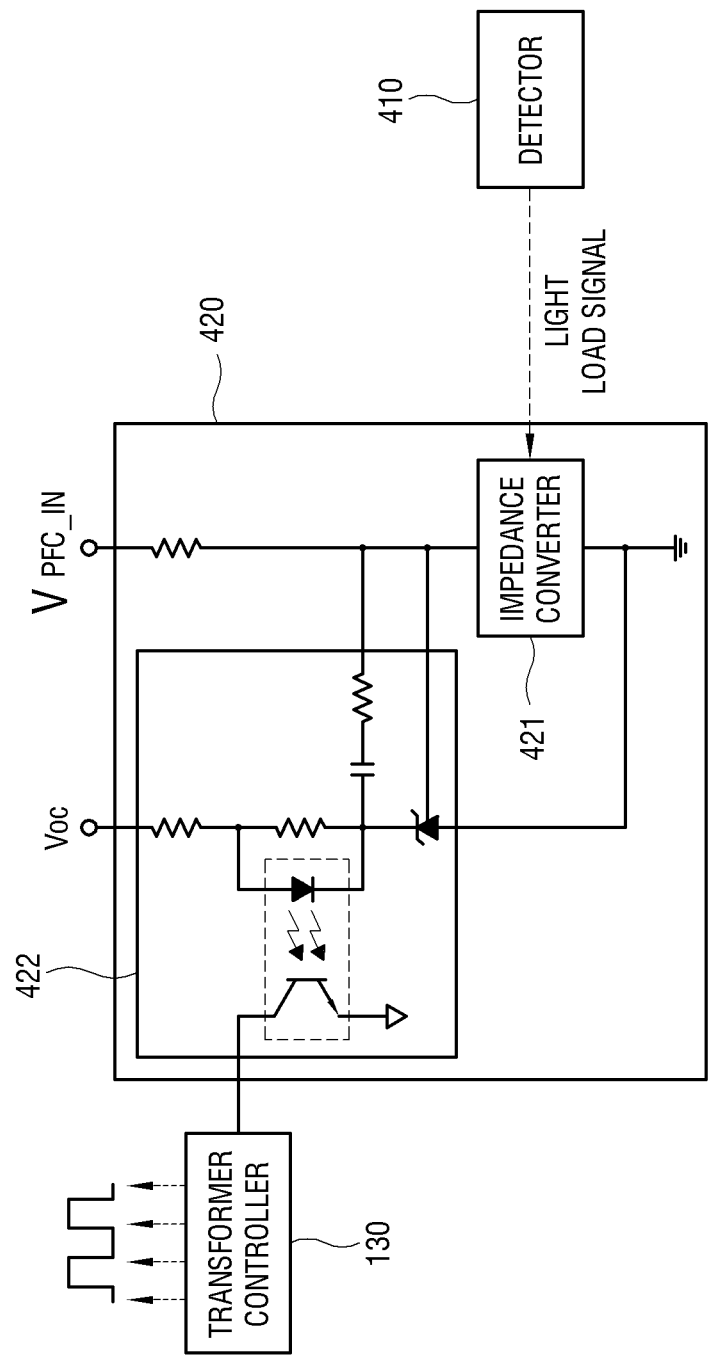
FIGS. 4 to 6 are circuit diagrams of a voltage regulator according to an embodiment of the disclosure.
Figure 5:
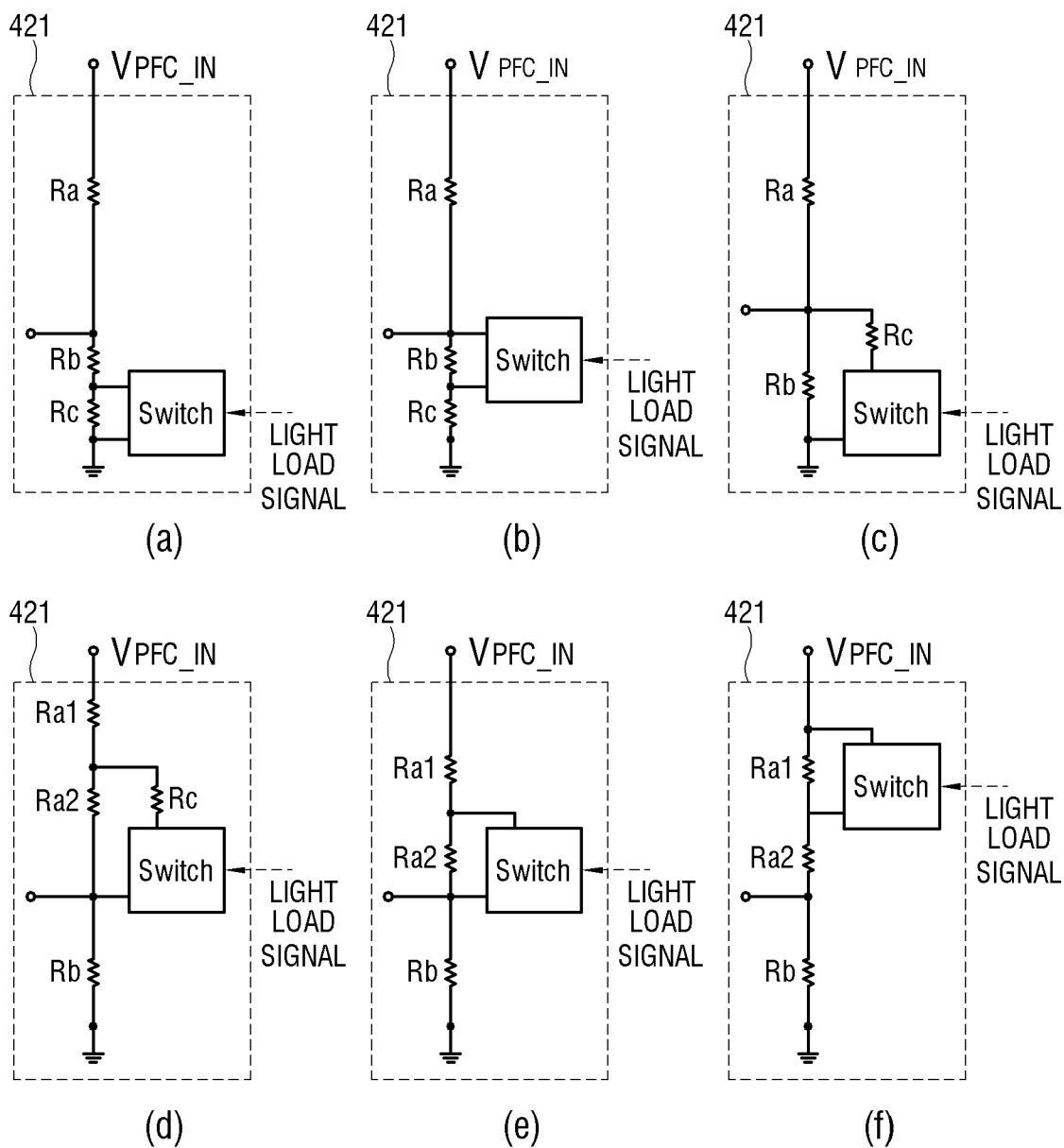
Figure 6:
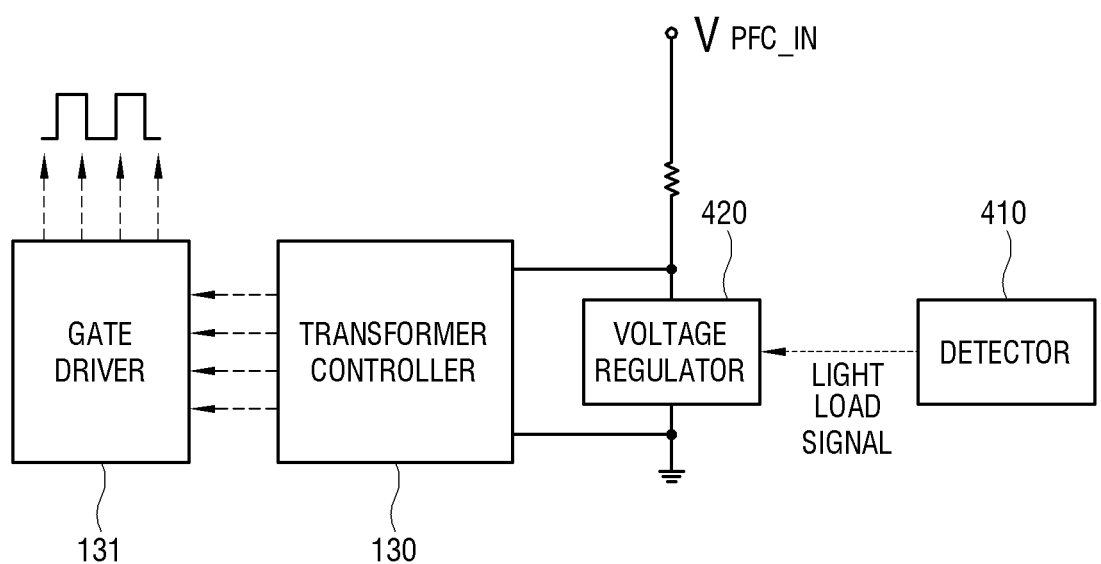

FIGS. 4 to 6 are circuit diagrams of a voltage regulator according to an embodiment of the disclosure.

According to an embodiment, the voltage regulator 420, as shown in FIG. 4, includes an impedance converter 421 for converting impedance based on the light load signal, and a voltage sensor 422 for detecting a feedback voltage based on the converted impedance.

The impedance converter 421 receives the light load signal from the detector 410, in which the light load signal may be either a high signal or a low signal. In the impedance converter 421 of FIG. 5, the switch block may be embodied by various combinations of a field effect transistor (FET) and a bipolar junction transistor (BJT) corresponding to whether the received light load signal operates in active high/low.

The voltage sensor 422 may be embodied by combinations of an integrated circuit (IC) or the like electronic device for receiving a detected voltage corresponding to the impedance converted by the impedance converter 421, and a photocoupler including a light emitter and a light receiver to transmit a signal corresponding to the received detected voltage.

FIG. 5 shows circuit diagrams of the impedance converter 421 of FIG. 4.

As shown in FIG. 5, the impedance converter 421 may be embodied by various impedance converting circuits converting impedance values of the voltage sensor 422 based on a voltage distribution principle.

For example, referring to (a) of FIG. 5, when the electronic apparatus 1 operates with not the light load but the normal load, a switch connected in parallel to a resistor $R_c$ is turned on, and thus a PFC input voltage $V_{PFC\_IN}$, in other words, an AC-AC transformer output voltage $V_{AC-AC\_out}$) is identified by the following expression 1 based on the principle of voltage distribution between $R_a$ and $R_b$ and operates as $V_{PFC\_IN}$ generally having a high voltage.

$$V_{PFC\_N} = \frac{R_a + R_b}{R_b} V_{ref} \quad \text{[Expression 1]}$$

where, $V_{ref}$ is a reference voltage of the voltage sensor 422, which is an internal reference voltage (for example, a reference voltage for a comparator or an operational amplifier (OP AMP)) of the electronic device that receives the detected voltage from the impedance converter 421 of FIG. 4.

When the light load signal from the detector 410 is input, the switch connected in parallel to the resistor Rc is turned off, and thus the PFC input voltage $V_{PFC\_IN}$, in other words, the AC-AC transformer output voltage $V_{AC\text{-}AC\_out}$ is identified based on the principle of voltage distribution among $R_a$, $R_b$ and $R_c$ as shown in the following expression 2. In this case, the PFC input voltage is changeable to have the same level as the PFC output voltage having a lower level of a normal operation mode by resistance of $R_c$.

$$V_{PFC\_IN} = \frac{R_a + R_b + R_c}{R_b + R_c} V_{ref} = V_{PFC\_OUT} \quad \text{[Expression 2]}$$

As described above, at the light load operation, the detected voltage of the voltage sensor 422 is changed by the impedance converter 421, and therefore the feedback voltage having a low level is fed back to the transformer controller 130 by the voltage sensor 422.

The transformer controller 130 receives the changed feedback voltage, and changes a duty ratio, i.e. a duty rate or an operating frequency applied to the FECT of the AC-AC transformer 120, thereby controlling the output voltage of the AC-AC transformer 120 to be varied. Therefore, it is possible to control the voltage level without adding separate elements to the AC-AC transformer.

Meanwhile, according to an alternative embodiment, when the transformer controller 130 is provided at not the transformer primary side but the secondary side, as shown in FIG. 6 the control signal is transmitted from the transformer controller 130 to a gate driver 131 and the duty ratio or the operating frequency applied to the FET of the AC-AC transformer 120 is controllable by the gate driver 131.

As described above, in the power circuit 10 according to an embodiment of the disclosure, the output voltage of the AC-AC transformer 120 is varied in such a manner that the transformer controller 130 changes the duty ratio or the operating frequency applied to the FET of the AC-AC transformer 120 at the light load operation. However, when a variable range of the voltage is very wide, the AC-AC transformer 120 needs to be designed to have a very large voltage gain width. When it is designed to have a very large voltage gain width, this causes another problem of lowering the circuit efficiency of the AC-AC transformer 120.

To solve this problem, the power circuit 10 an embodiment of the disclosure further includes the voltage gain controller 140 capable of controlling a voltage gain by changing the transformer turn ratio of the AC-AC transformer 120.

Figure 7:
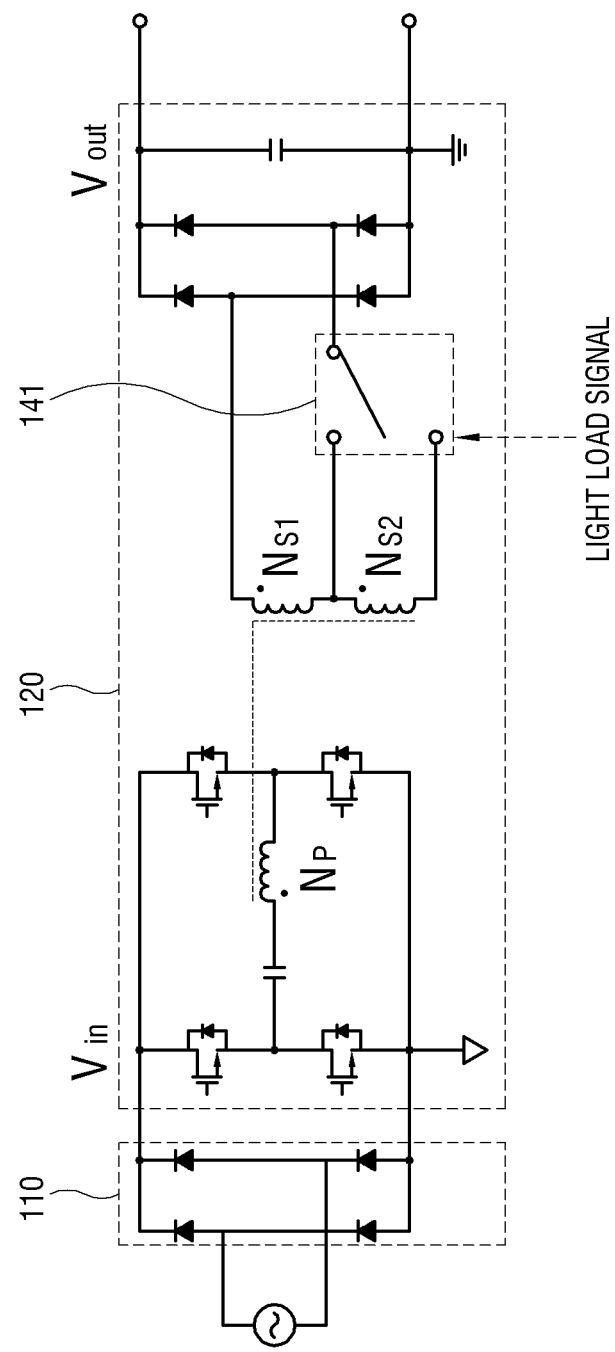
FIGS. 7 to 9 are circuit diagrams with a voltage gain controller according to embodiments of the disclosure.
Figure 8:
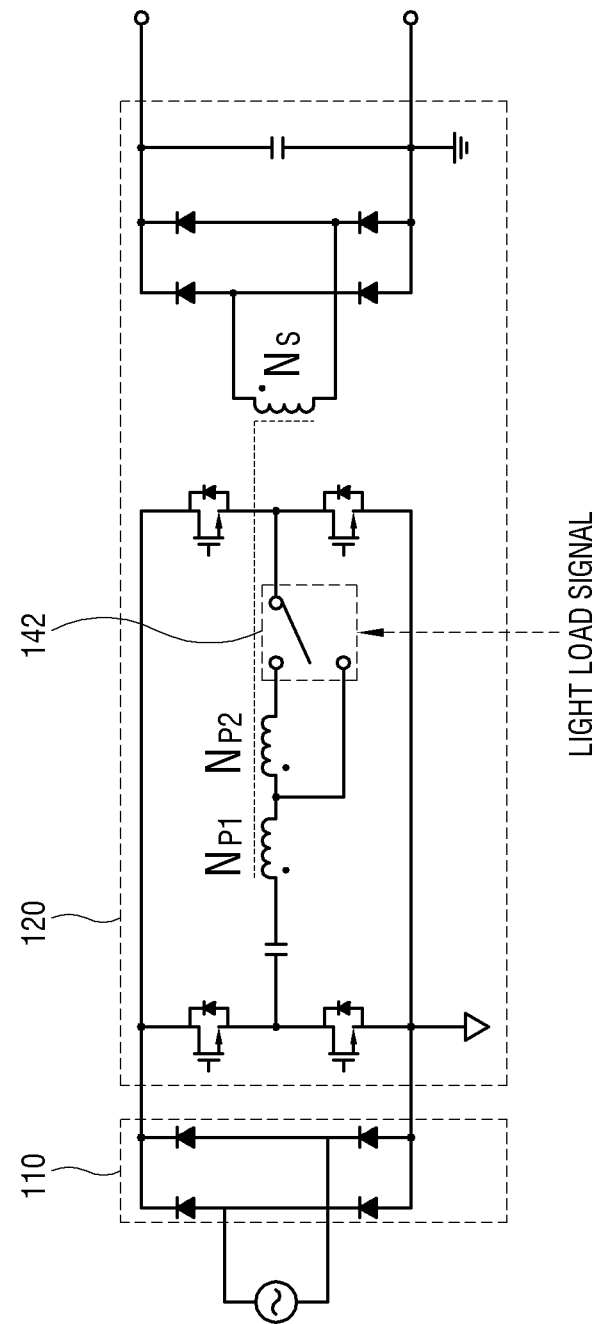
Figure 9:
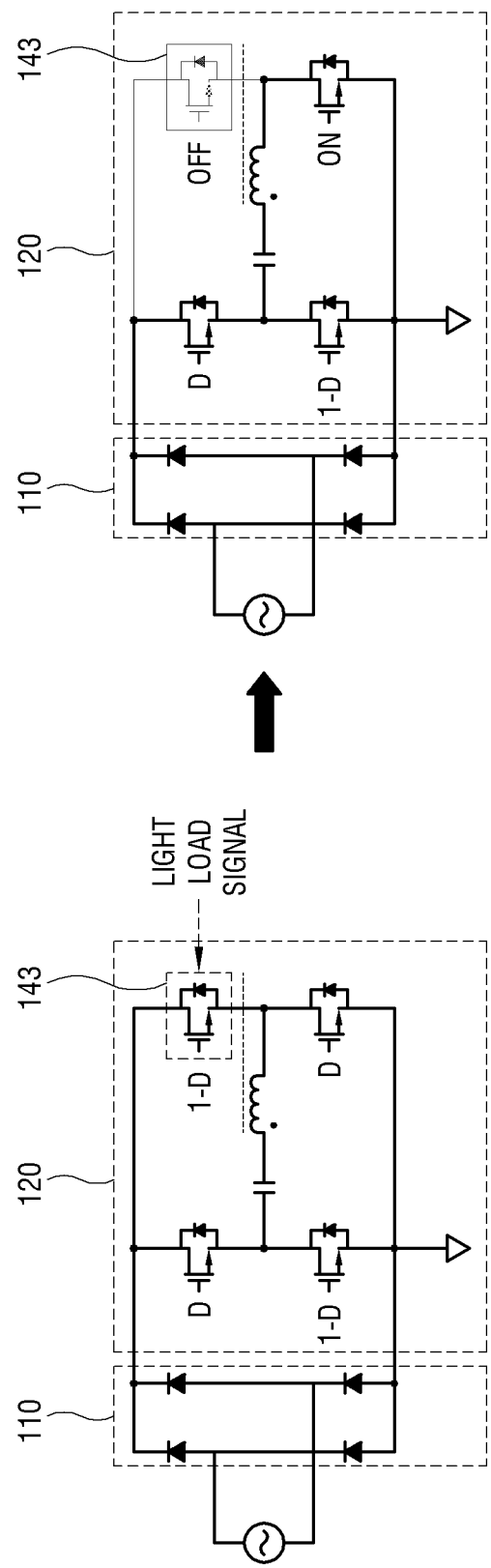

FIGS. 7 to 9 are circuit diagrams with a voltage gain controller according to embodiments of the disclosure.

As shown in FIGS. 7 and 8, the voltage gain controller 140 includes switches 141 and 142 provided inside the AC-AC transformer 120, and the switches 141 and 142 are connected to the taps provided at the primary side or the secondary side of the transformer.

In general, the voltage gain of the converter using the transformer is expressed by a function of turns ratio, duty and frequency of the transformer as shown in the following expression 3. Therefore, when the turns ratio of the transformer is changed, it is possible to largely change the level of the output voltage without even changing the duty and operating frequency of the AC-AC transformer 120.

$$A_v = \frac{V_{out}}{V_n} = f(\text{Turns ratio, Duty, Frequency, } \ldots) \quad \text{[Expression 3]}$$

For example, when the tap is provided at the secondary winding as shown in FIG. 7, a part of the secondary winding corresponding to the number of turns in the winding $N_{S1}$ from one end of the secondary winding to the tap is driven in response to a switching operation of the switch 141 at the light load operation.

In the same manner, even in FIG. 8, the turns ratio of the transformer is changeable by operating the switch 142 in response to the light load signal.

When the turns ratio of the transformer is changed as described above, it is possible to design a high-efficiency AC-AC transformer operating at specific duty and specific operating frequency.

In the voltage gain controller 140 described with reference to FIGS. 7 and 8, a voltage gain conversion ratio such as ⅓ is variously selectable according to the positions of the tap, the number of turns in the primary side or the secondary side, etc.

Meanwhile, according to another embodiment, as shown in FIG. 9, the voltage gain controller 140 may be achieved by topology variation in the AC-AC transformer 120.

Specifically, the AC-AC transformer 120 serves as a full bridge at the normal load. At the light load operation, the AC-AC transformer 120 serves as a half bridge by turning on or off the FETs based on change in the PWM control signal.

As shown in FIG. 9, in an embodiment where the voltage gain is controlled by changing the topology of the AC-AC transformer 120, the voltage gain conversion ratio is fixed to ½, and therefore the duty or operating frequency may be additionally controlled by the transformer controller 130 in order to change the voltage to have a desired level.

In such a case where the voltage gain controller 140 is provided, not only the operating frequency or duty of the AC-AC transformer but also the voltage gain is controlled, thereby preventing the circuit's own efficiency from being lowered even through the variable range of the AC-AC transformer output voltage is very large.

As described above, the voltage regulator 420 or the voltage gain controller 140 operates to stop the operation of the PFC 200 in the light load section where the voltage of the AC-AC transformer 120 is varied, thereby allowing the output voltage $V_{AC\text{-}AC\_out}$ of the AC-AC transformer 120 to be input and then intactly output as bypassed through the bypasser 210.

Figure 10:
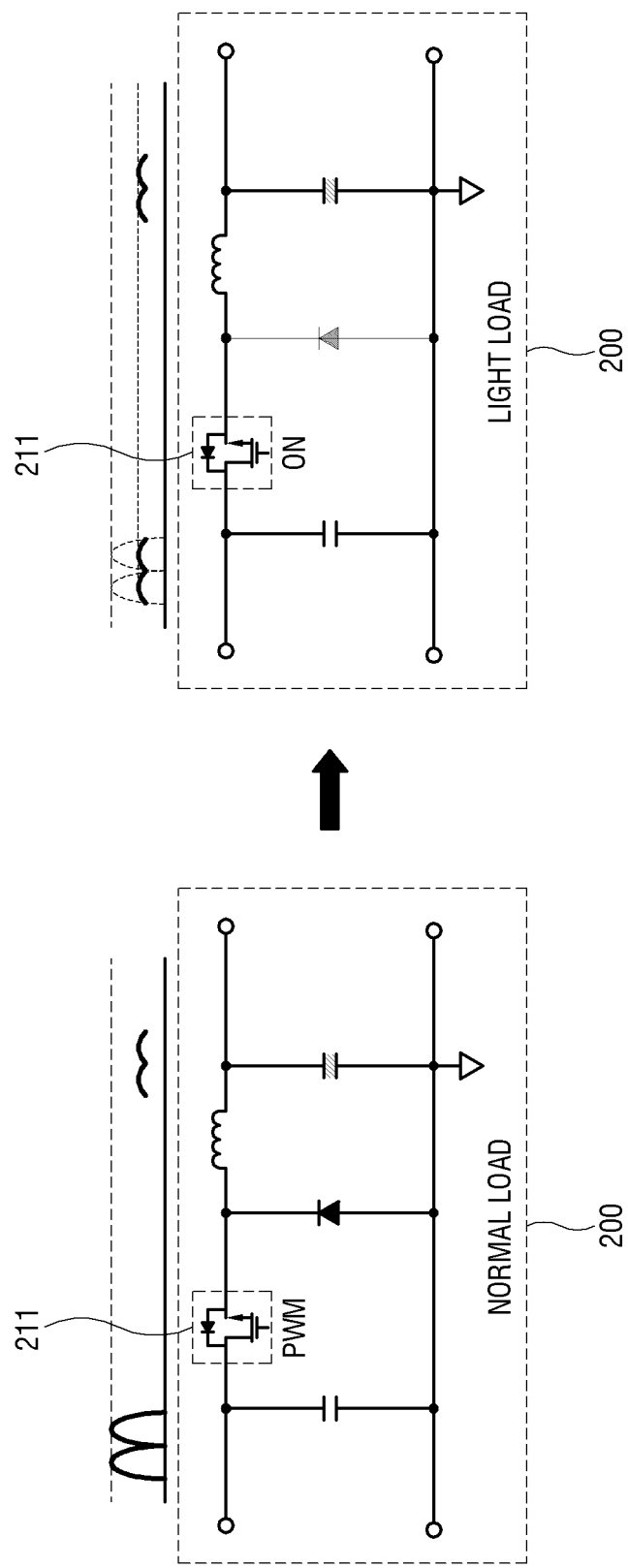
FIGS. 10 and 11 illustrate a power factor corrector (PFC) including a bypasser according to an embodiment of the disclosure.
Figure 11:
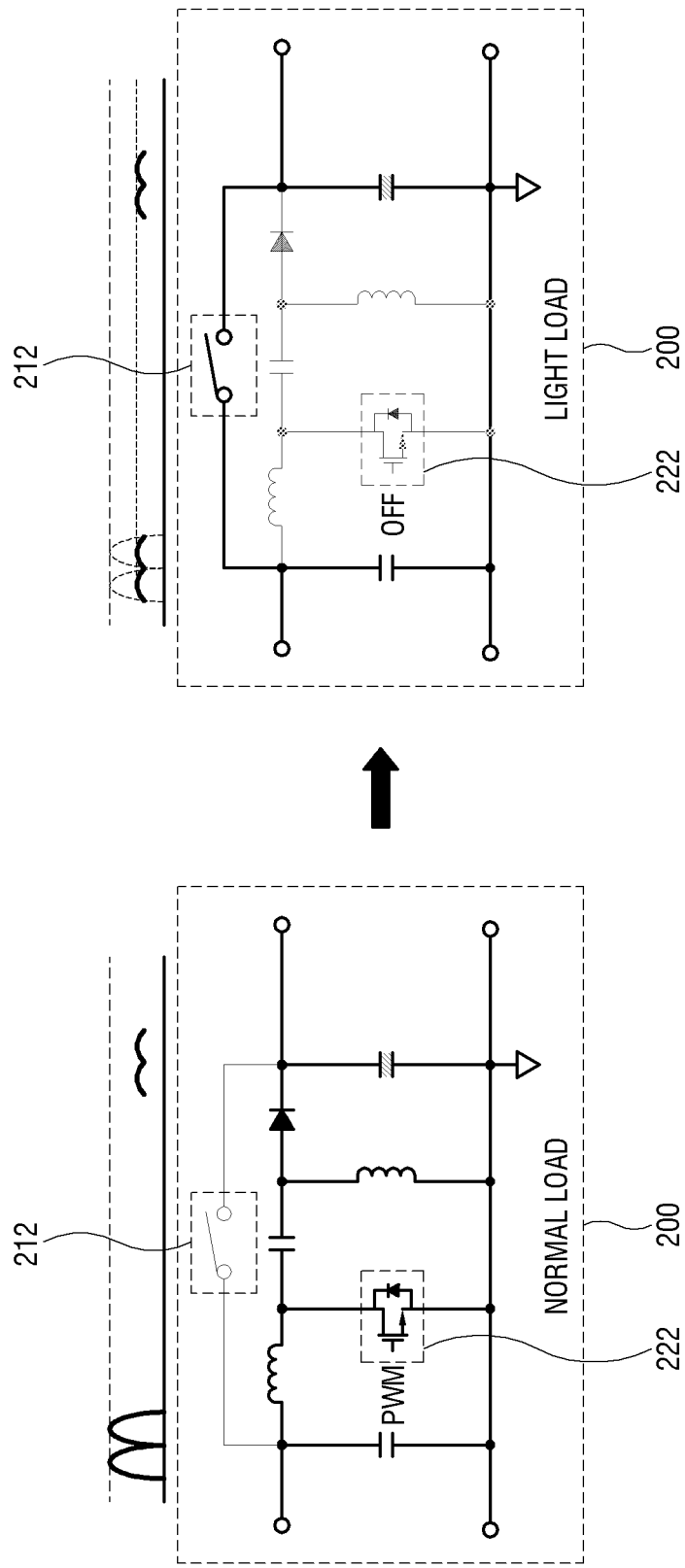

FIGS. 10 and 11 illustrate a power factor corrector (PFC) including a bypasser according to an embodiment of the disclosure.

As shown in FIG. 10, when the PFC 200 is embodied by a buck PFC converter, an FET switch 211 to be turned on or off based on a PWM control signal serves as the bypasser 210.

Specifically, as shown in FIG. 10, when the PFC 200 is the step-down PFC, a level (a peak voltage) of the power is lowered and then output in the normal load. When the electronic apparatus 1 operates in the light load, as shown in FIG. 10 the FET switch 211 is turned on. Here, the PFC 200 includes a PFC controller, i.e. a PFC IC (see '220' in FIG. 12) of outputting the PWM control signal, so that the light load signal can be output from the detector 410 to the PFC controller 220 at the light load operation, and thus the PFC controller 220 received the light load signal can turn on the FET switch 211.

Accordingly, it will be appreciated that a bypassing path is formed along the FET switch 211, and the input voltage $V_{PFC\_IN}$ received from the AC-AC transformer 120 is output as it is without level change.

As shown in FIG. 11, when the PFC 200 is embodied by the SEPIC PFC converter, a switch 212 serving as the bypasser 210 is provided in addition to an FET switch 222. In other words, the PFC 200 according to an embodiment may construct the bypasser 210 by combination of a relay and an FET. Accordingly, such a simple circuit construction makes it possible to selectively bypass the PFC.

Specifically, as shown in FIG. 11, when the PFC 200 is the step-down PFC, the level (peak voltage) of the power is decreased and output in the normal load. When the electronic apparatus 1 operates in the light load, as shown in FIG. 11 the bypassing path is formed as the switch 212 is turned on based on a control signal received from the detector 410, and it will be understood that the input voltage $V_{PFC\_IN}$ received from the AC-AC transformer 120 is output as it is without level change.

Here, the PFC 200 includes the PFC controller, in other words, the PFC IC 220 of outputting the PWM control signal, so that the light load signal can be output from the detector 410 to the PFC controller 220 in the light load operation, and the PFC controller 220 received the light load signal can turn off the FET switch 222. When the FET switch 222 is turned off, the PFC 200 stops the power factor correction and operates in the bypass mode along the bypassing path formed by the switch 212.

Below, a term 'bypass switch' may be used to indicate a FET switch 211 or a relay switch 212. However, the PFC 200 according to the disclosure is not limited to the form shown in FIG. 10 or 11, but may be embodied by a converter of various forms and include the bypass switch corresponding to the forms. For example, as shown in FIG. 11, a method of adding the switch 212 may be applicable to any topology as well as the SEPIC PFC converter.

Figure 12:
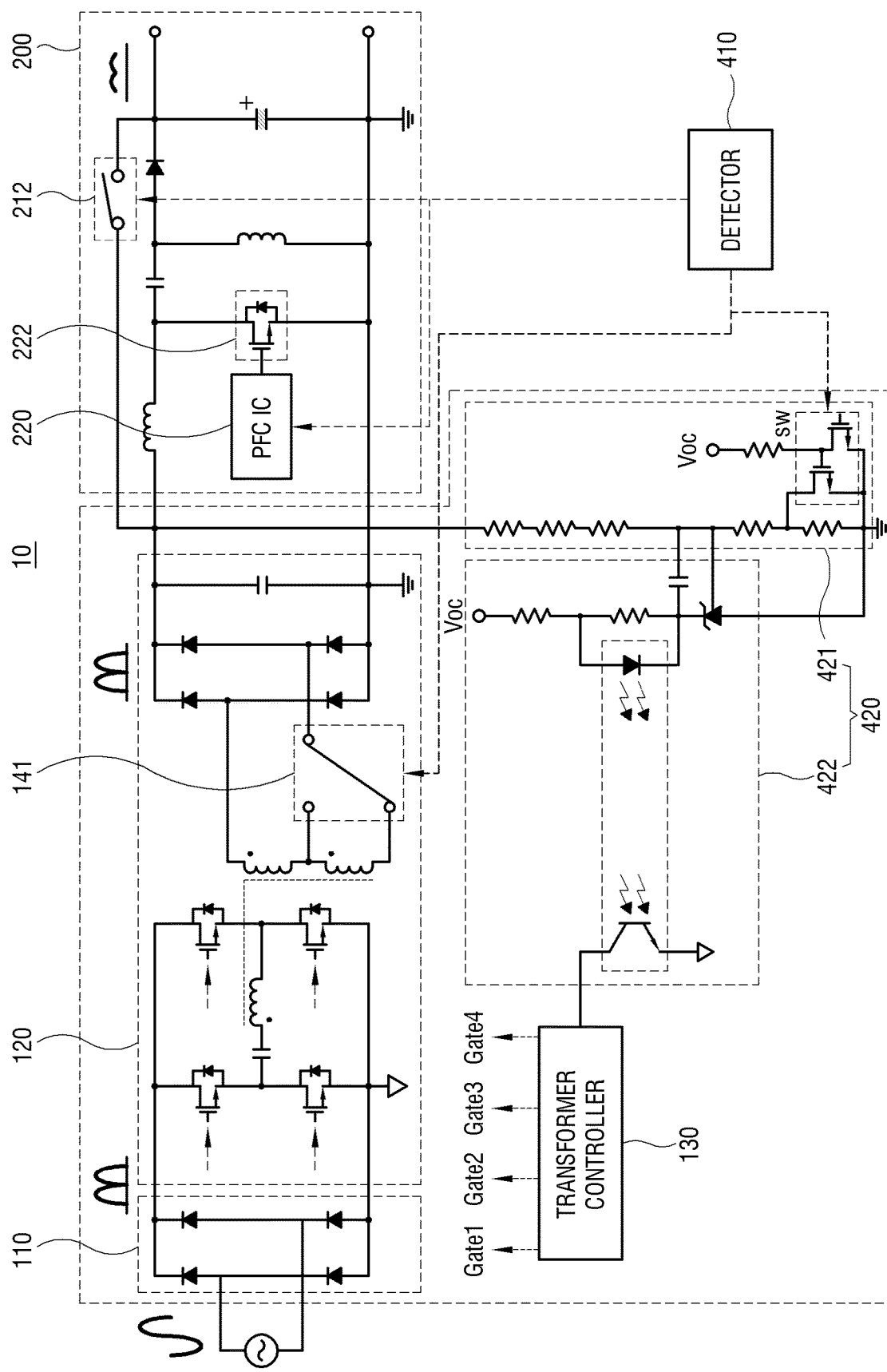
FIG. 12 is a circuit diagram of a power circuit in an electronic apparatus according to an embodiment of the disclosure.
Figure 13:
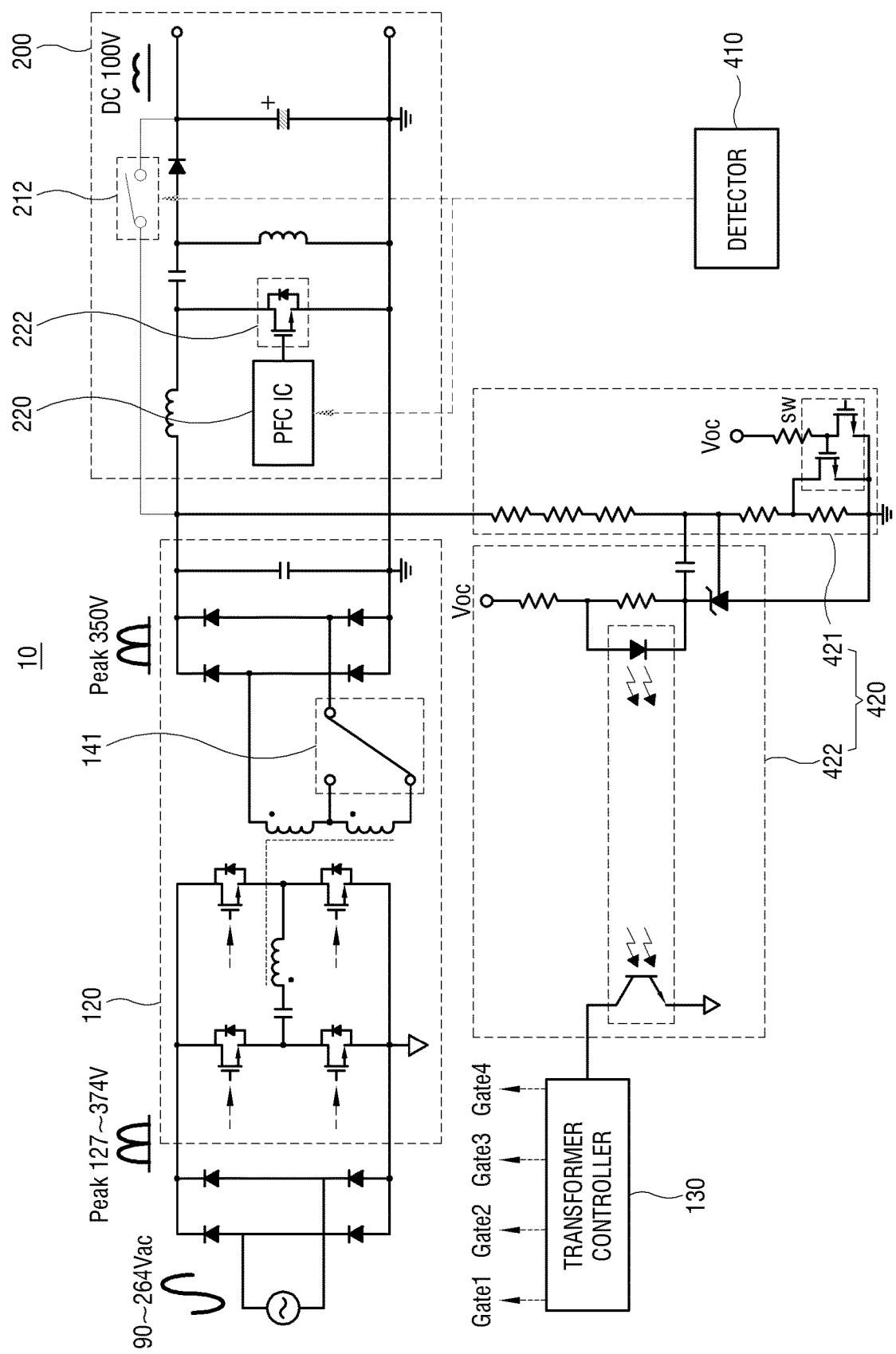
FIG. 13 is a circuit diagram of an equivalent circuit when the power circuit of FIG. 12 operates with normal load.
Figure 14:
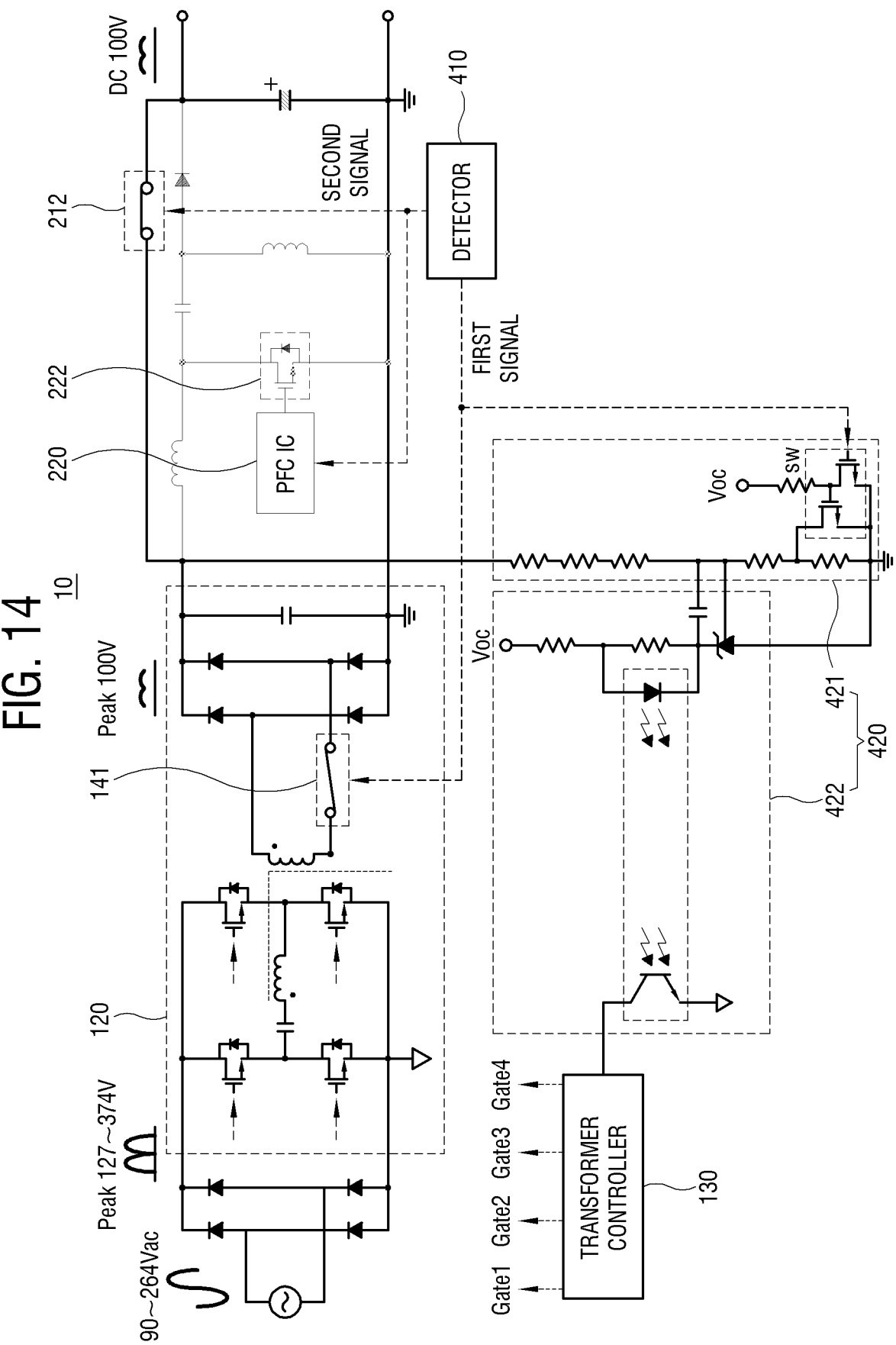
FIG. 14 is a circuit diagram of a circuit diagram of an equivalent circuit when the power circuit of FIG. 12 operates in a light load section.

FIG. 12 is a circuit diagram of a power circuit in an electronic apparatus according to an embodiment of the disclosure, FIG. 13 is a circuit diagram of an equivalent circuit when the power circuit of FIG. 12 operates with normal load, and FIG. 14 is a circuit diagram of a circuit diagram of an equivalent circuit when the power circuit of FIG. 12 operates in a light load section.

Figure 15:
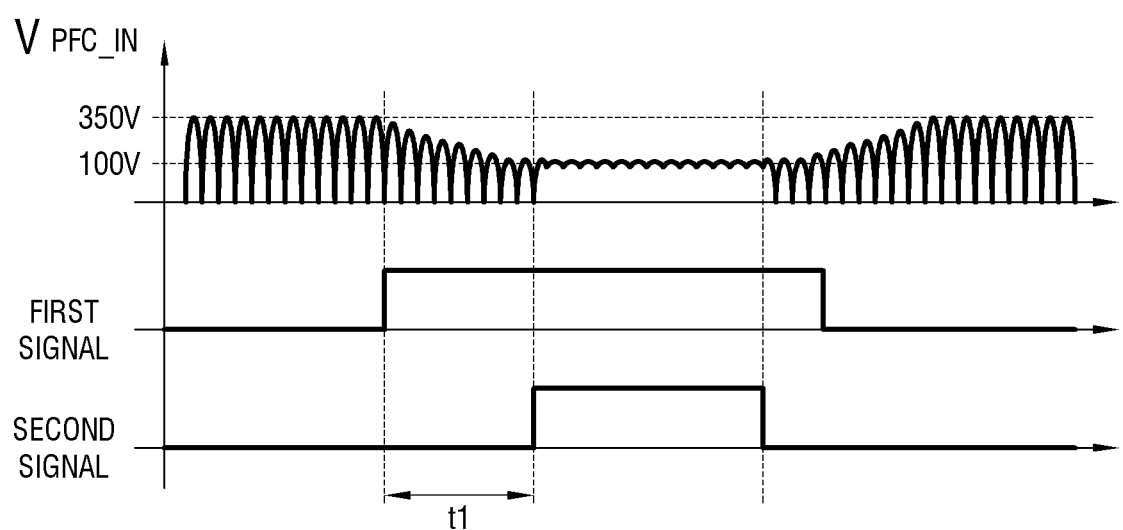
FIGS. 15 and 16 are graphs of signals based on operations of a power circuit in an electronic apparatus according to an embodiment of the disclosure.
Figure 16:
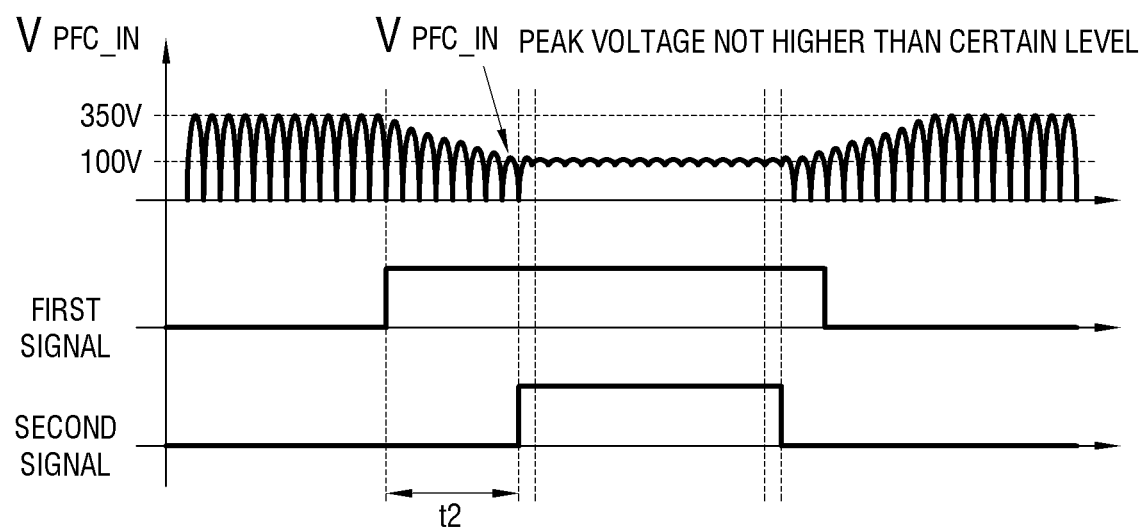

FIGS. 15 and 16 are graphs of signals based on operations of a power circuit in an electronic apparatus according to an embodiment of the disclosure.

The power circuit 10 of the electronic apparatus according to an embodiment of the disclosure, as shown in FIG. 12, includes the rectifier 110 that receives input power (AC power) and applies full-wave rectification to the received input power, and the AC-AC transformer 120 that receives the full-wave rectified power from the rectifier 110 and supplying power under the transformer controller 130. The rectifier 110 and the AC-AC transformer 120 are included in the first voltage converter 100 described with reference to FIG. 1.

The transformer controller 130 receives a feedback voltage from the voltage regulator 420, and outputs a corresponding control signal to each FET gate of the AC-AC transformer 120, thereby controlling the operations of the AC-AC transformer 120.

Specifically, when the electronic apparatus 1 operates in the normal load, as shown in FIG. 13 an AC voltage having a peak voltage of 127~374V from a rectifier 110 is input to the AC-AC transformer 120, and the AC-AC transformer 120 outputs a first voltage having a peak voltage of 350V under control of the transformer controller 130. The output voltage of the AC-AC transformer 120 is fed back to the transformer controller 130 through the voltage regulator 420.

Through the foregoing control process, the first voltage $V_{AC\text{-}AC\_out}$ output from the AC-AC transformer 120 is input to the PFC 200 as the input voltage $V_{PFC\_IN}$.

The PFC 200 outputs the second voltage by performing the power factor correction for the first voltage received from the AC-AC transformer 120. When the electronic apparatus 1 operates in the normal load, as shown in FIG. 13 DC 100V obtained by subjecting the first voltage to the power factor correction is output from the PFC 200 as the second voltage.

The second voltage output from the PFC 200 is output to the load, in other words, the operator 20 including the electronic devices 21 and 22 as the third voltage of which the level is adjusted by the second voltage converter 300 shown in FIG. 1. Thus, the operator 20 including the display and the like electronic devices can stably receive an operation voltage even in the light load section.

The AC-AC transformer 120 of the power circuit 10 may, as shown in FIG. 12, include a bypass switch 212 for providing a bypassing path in the light load section.

In the electronic apparatus 1 according to an embodiment of the disclosure, the AC-AC transformer 120 of the power circuit 10 may, as shown in FIG. 12, further include the switch 141 provided as the voltage gain controller 140 capable of controlling the voltage gain by changing the transformer turns ratio. FIG. 12 shows an example that the switch 141 is embodied in the form of being connectable to the tap of the transformer secondary side.

Below, it will be described that the power circuit 10 operates in the light load operation.

As shown in FIG. 14, the detector 410 outputs the light load signal (i.e. the first signal) to the voltage regulator 420 and the voltage gain controller 140 when it is detected that the electronic apparatus 1 operates in the light load section. The output light load signal may be either a high signal or a low signal according to circuit design, and FIGS. 15 and 16 illustrate a case where the light load signal is the high signal.

In the impedance converter 421 of the voltage regulator 420, as shown in (a) of FIG. 5, a switch block SW is turned off based on a received light load signal, and the detected voltage of the voltage sensor 422 is changed, i.e. lowered by the principle of voltage distribution among $R_a$, $R_b$ and $R_c$ and fed back to the transformer controller 130.

According to an embodiment, the transformer controller 130 controls the operating frequency or duty of the FET of the AC-AC transformer 120 based on the changed feedback voltage, and thus the first voltage of which the peak voltage is lowered into 100V as shown in FIG. 14 is output from the AC-AC transformer 120

According to an alternative embodiment, the bypass switch 141 connected to the tap of the secondary side of the AC-AC transformer 120 receives the light load signal and performs a switching operation, so that a part of the secondary winding is driven corresponding to the number of tuns in the winding $N_{S1}$ from one end of the secondary winding to the tap, thereby allowing the AC-AC transformer 120 to output the first voltage of which the peak voltage is lowered into 100V as shown in FIG. 14.

As described above, the level of the voltage output from the AC-AC transformer 120 in the light load operation corresponds to the level of the second voltage output by the PFC 200 in the normal load. In other words, it will be understood that the first voltage output from the AC-AC transformer 120 is output as lowered to have the level corresponding to the second voltage in the light load section.

As shown in FIGS. 15 and 16, when the first signal is output to the voltage regulator 420 and the voltage gain controller 140, the level of the voltage $V_{PFC\_IN}$ output from the AC-AC transformer 120 to the PFC 200 is gradually lowered from 350V to 100V.

Further, the detector 410 outputs the light load signal (i.e. the second signal) to the PFC 200 when it is detected that the electronic apparatus 1 operates with the light load. Here, the detector 410 may output the signal to the PFC controller 220 and the bypass switch 212 of the PFC 200.

Here, for stable operation, the second signal may be output after the first signal is output and then the voltage $V_{PFC\_IN}$ is decreased into a sufficiently low level.

According to an embodiment, the detector 410 may, as shown in FIG. 15, output the second signal when a preset period of time t1 elapses after the first signal is output.

According to an alternative embodiment, the detector 410 may monitor the level of the voltage $V_{PFC\_IN}$ output from the AC-AC transformer 120 after the first signal is output, and output the second signal at a point in time when a predetermined period of time t2 elapses, at which the peak voltage $V_{PFC\_IN}$ is decreased to be lower than a certain level as shown in FIG. 16.

When the detector 410 outputs the second signal to the PFC 200, as shown in FIG. 14 the bypass switch 212 is connected and the PFC controller 220 turns off the FET switch 222, thereby making the PFC 200 do not work.

In other words, the PFC 200, as shown in FIG. 14, receives the first voltage, of which the peak voltage is lowered into 100V, from the AC-AC transformer 120, and output the received first voltage as it is through the bypassing path formed by the bypass switch 212. Therefore, in the light load section where the power consumption is low, stable operation is possible even though the PFC does not work and the voltage bypasses the PFC.

Below, a power control method of an electronic apparatus according to an embodiment of the disclosure will be described with reference to the accompanying drawings.

Figure 17:
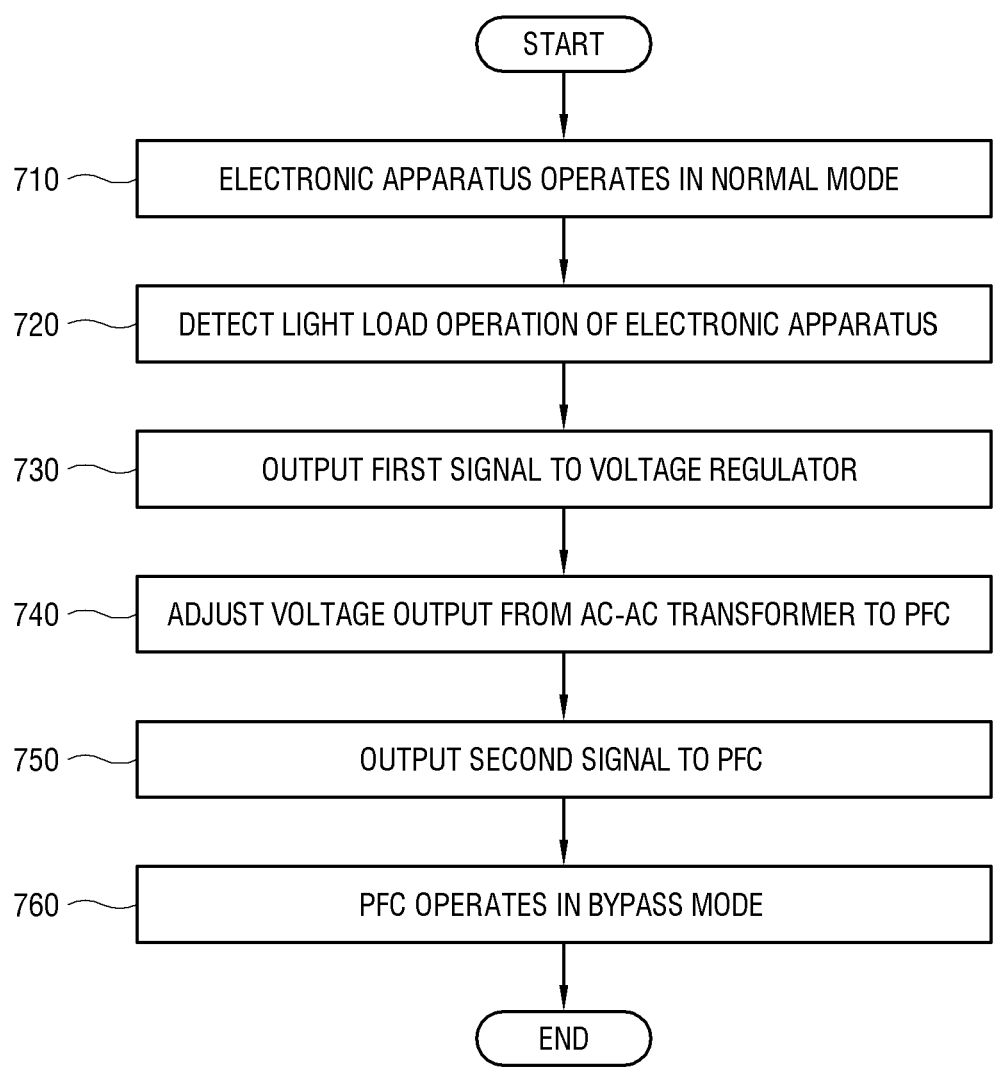
FIG. 17 is a flowchart showing a power control method of an electronic apparatus according to an embodiment of the disclosure.

FIG. 17 is a flowchart showing a power control method of an electronic apparatus according to an embodiment of the disclosure.

As shown in FIG. 17, the electronic apparatus 1 operates with a normal load (or heavy load) as if the TV processes and displays a broadcast or the like image signal (710).

The power circuit 10 of the electronic apparatus 1 detects whether the electronic apparatus 1 operates with a light load (720). Here, the power circuit 10 may use the detector 410 to detect the light load operation, in which the detector 410 may detect the light load operation by detecting a spot where the power consumption of the operator 20 including the load, i.e. the electronic devices 21 and 22 is lower than or equal to a predetermined value, or by receiving a mode signal corresponding to the light load operation.

When the light load operation is detected in the operation 720, the detector 410 outputs the first signal (i.e. the light load signal) to the voltage regulator 420 (730). Here, the detector 410 may further output the first signal to the voltage gain controller 140.

When the first signal is output in the operation 730, the feedback voltage of the transformer controller 130 is changed to control the operating frequency or duty of the AC-AC transformer 120, or the transformer turns ratio of the AC-AC transformer 120 is changed to adjust, i.e. drop the voltage output from the AC-AC transformer 120 to the PFC 200 (740).

The detector 410 outputs the second signal (i.e. the light load signal) to the PFC 200 (750). Here, the detector 410 may output the second signal when a preset time elapses after the first signal is output in the operation 730 or when it is monitored and identified that the level of the output voltage of the AC-AC transformer 120 is lower than or equal to a specific level.

The PFC 200 received the second signal in the operation 750 operates in a bypass mode, and thus the voltage dropped in the operation 740 is output bypassing the PFC 200 (760). Therefore, no problems arise in the operations of the whole power circuit 10 even though the devices having the output terminals, to which the PFC 200 is connected as the step-down PFC circuit, are designed for a low voltage rate.

By the foregoing operations 750 and 760, the voltage is controlled to have a sufficiently low level and then bypass the PFC, and it is thus possible to maintain the stability of the operations. In particular, the voltage is monitored and controlled to bypass the PFC when it is identified that the level of the voltage is sufficiently lowered, thereby improving the stability of the operations.

Although a few exemplary embodiments have been shown and described, it will be appreciated that changes may be made in these exemplary embodiments without departing from the scope defined in the appended claims.

The invention claimed is:

1. An electronic apparatus comprising:
an operator; and
a power circuit configured to supply power to the operator,
wherein the power circuit comprises:
a first voltage converter configured to receive input voltage and convert the input voltage into a first voltage,
a power factor corrector (PFC) configured to perform power factor correction for lowering the first voltage to a level corresponding to a second voltage, the PFC providing a bypass path of the power factor correction, and
a controller configured to detect that power consumption of the operator is lowered than or equal to a predetermined value,
wherein, based on detecting that the power consumption of the operator is lowered than or equal to the predetermined value, the controller is configured to control the first voltage converter to output a third voltage having the level corresponding to the second voltage to the PFC so that the power circuit stops an operation of the power factor correction through the bypass path of the PFC and supplies power based on the third voltage having the level corresponding to the second voltage to the operator,
wherein the power circuit further comprises a second voltage converter configured to output a fourth voltage, which is obtained by adjusting the level corresponding to the second voltage, to the operator,
wherein the PFC comprises a bypasser, which provides the bypass path, configured to selectively connect the first voltage converter and the second voltage converter by bypassing the PFC,
wherein the controller is configured to output a signal for connecting the bypasser to transmit the third voltage having the level corresponding to the second voltage to the second voltage converter, based on detecting that the power consumption of the operator is lowered than or equal to the predetermined value,
wherein the first voltage converter comprises an alternating current (AC)-AC transformer configured to output the first voltage; and a transformer controller configured to control an operation of the AC-AC transformer by feeding back an output voltage of the AC-AC transformer, and wherein the controller comprises a detector configured to output a first signal based on detecting that the power consumption of the operator is lowered than or equal to the predetermined value; and a voltage regulator configured to regulate a voltage fed back to the transformer controller based on the first signal received from the detector.

2. The electronic apparatus according to claim 1, wherein the voltage regulator comprises a switch configured to operate based on the first signal received from the detector, and an impedance converter comprising a plurality of resisters, and the impedance converter is changed in impedance based on the operation of the switch to regulate the voltage fed back to the transformer controller.

3. The electronic apparatus according to claim 2, wherein the transformer controller controls the AC-AC transformer to output the third voltage having the level corresponding to the second voltage, by controlling an operating frequency or a duty ratio of the AC-AC transformer based on the regulation of the voltage to be fed back.

4. The electronic apparatus according to claim 1, wherein the AC-AC transformer comprises a tap at a primary side or a secondary side, and a switch connected to the tap and configured to operate based on the first signal received from the detector, and the AC-AC transformer is controlled with regard to a voltage gain based on the operation of the switch, and output the third voltage having the level corresponding to the second voltage.

5. The electronic apparatus according to claim 1, wherein the detector is configured to output the first signal, and further output a second signal to the PFC based on a lapse of a preset time.

6. The electronic apparatus according to claim 5, wherein the detector monitors the output voltage of the AC-AC transformer and outputs the second signal based on detecting that the output voltage from the AC-AC transformer to the PFC is lowered than or equal to the predetermined value.

7. The electronic apparatus according to claim 5, wherein the bypasser comprises a bypass switch configured to form the bypass path as turned on or off based on reception of the second signal.

8. The electronic apparatus according to claim 1, wherein the detector is configured to receive a mode signal corresponding to a light load, and detect that the power consumption of the operator is lowered than or equal to the predetermined value.

9. The electronic apparatus according to claim 1, wherein the AC-AC transformer and the voltage regulator are provided in an adapter configured to receive input power, and the PFC is provided in a main body of the electronic apparatus.

10. The electronic apparatus according to claim 1, wherein the PFC comprises a step-down power factor correction circuit.

* * * * *